(12) United States Patent
Duan

(10) Patent No.: US 8,055,275 B2
(45) Date of Patent: *Nov. 8, 2011

(54) INTERACTIVE METHOD FOR REPORTING LOCATION REPORT BY TARGET USER EQUIPMENT IN LOCATION SERVICE

(75) Inventor: Xiaoqin Duan, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 385 days.

This patent is subject to a terminal disclaimer.

(21) Appl. No.: 10/554,544

(22) PCT Filed: Jun. 14, 2004

(86) PCT No.: PCT/CN2004/000640
§ 371 (c)(1),
(2), (4) Date: Aug. 15, 2006

(87) PCT Pub. No.: WO2004/112410
PCT Pub. Date: Dec. 23, 2004

(65) Prior Publication Data
US 2007/0054675 A1    Mar. 8, 2007

(30) Foreign Application Priority Data
Jun. 12, 2003   (CN) .................................. 03 1 48654

(51) Int. Cl.
*H04W 24/00* (2009.01)
(52) U.S. Cl. ............... 455/456.2; 455/456.1; 455/456.3; 455/456.5; 455/456.6; 455/404.2; 714/749
(58) Field of Classification Search ....... 455/456.1–466; 714/746–749
See application file for complete search history.

(56) References Cited

U.S. PATENT DOCUMENTS 5,734,963 A    3/1998   Fitzgerald
(Continued)

FOREIGN PATENT DOCUMENTS

CN      1145378 C    5/2001
(Continued)

OTHER PUBLICATIONS

Digital cellular telecommunications system (Phase 2+) (GSM); Universal Mobile Telecommunications System (UMTS); Location Services (LCS); Service description, Stage 1 (3GPP TS 22.071 version 5.1.1 Release 5); ETSI TS 122 071; ETSI Standards, European Telecommunications Standards Institute, Sophia-Antipo, FR, vol. 3-SAI, No. V511 Mar. 2002, XP014007185 ISSN 0000-0001—relevant paragraphs 3.2; 4.8; 4.15 to 4.18; 4.15 to 4.18; 5.2 to 6.2; 6.4.5 to 6/6.

(Continued)

*Primary Examiner* — Lester Kincaid
*Assistant Examiner* — Mehmood B Khan
(74) *Attorney, Agent, or Firm* — Slater & Matsil, L.L.P.

(57) ABSTRACT

Disclosed is an interactive method for reporting location reports by a target UE in an LCS. The method comprises: the target UE receiving a location request initiated by an applicant and reporting a location report to the LCS system after detecting the occurrence of an event triggering a location report; the LCS system returning to the target UE a location report acknowledgement after receiving the location report submitted by the target UE. Further, while submitting the location report to the LCS system, the target UE starting a timer designating a time period and judging whether it has received a location report acknowledgement returned by the LCS system within the designated time period, if yes, stopping the timer designating the time period; otherwise, reporting once again the location report to the LCS system and re-starting the timer designating the time period at the same time. In accordance with this method, errors in reporting location reports are reduced and the uncertainty in implementation of LCS is lowered.

8 Claims, 2 Drawing Sheets

U.S. PATENT DOCUMENTS

| | | | |
|---|---|---|---|
| 5,889,770 A * | 3/1999 | Jokiaho et al. | 370/337 |
| 6,859,462 B1 * | 2/2005 | Mahoney et al. | 370/428 |
| 7,013,419 B2 * | 3/2006 | Kagan et al. | 714/749 |
| 7,054,615 B2 * | 5/2006 | Evensen et al. | 455/411 |
| 2001/0009857 A1 | 7/2001 | Vanttinen | |
| 2001/0051526 A1 | 12/2001 | Ruutu et al. | |
| 2003/0007459 A1 | 1/2003 | Yi et al. | |
| 2004/0253964 A1 * | 12/2004 | Zhu | 455/456.3 |
| 2006/0135174 A1 * | 6/2006 | Kraufvelin et al. | 455/456.1 |
| 2006/0293051 A1 * | 12/2006 | Ewert et al. | 455/433 |

FOREIGN PATENT DOCUMENTS

| | | | |
|---|---|---|---|
| CN | 1324553 A | | 11/2001 |
| CN | 1388713 A | | 1/2003 |
| EP | 1231736 A | | 8/2002 |
| EP | 1 617 686 A1 | | 1/2006 |
| JP | 2000-36979 | | 2/2000 |
| JP | 2002-217818 | | 8/2002 |
| WO | WO 0025545 A1 | | 4/2000 |
| WO | WO 00/25545 | | 5/2000 |
| WO | WO 02/085049 | | 10/2002 |
| WO | WO 02080472 A1 | | 10/2002 |
| WO | WO 03034770 A1 | | 4/2003 |

OTHER PUBLICATIONS

Chinese Priority Document of EP 1 617 686 A1.
English translation of the Chinese priority document.
Certified English translation of the Chinese priority document.
3GPP TS 23.271 V6.7.0 (Mar. 2004); $3^{rd}$ Generation Partnership Project; Technical Specification Group Services and System Aspect; Functional stage 2 description of Location Services (LCS) (Release 6).
English Translation of International Preliminary Report of Patentability for PCT/CN2004/000640, Applicant: Huawei Technologies Co., Ltd., Sep. 16, 2004, 4 pages.
Russian Office Action, Application No. 2005133200, Applicant: Huawei Technologies Co., Ltd., Feb. 16, 2007, 8 pages.
Canadian Office Action, Application No. 2,523,595, Applicant: Huawei Technologies Co., Ltd., Apr. 8, 2008, 3 pages.
Canadian Office Action, Application No. 2,523,595, Applicant: Huawei Technologies Co., Ltd., Mar. 3, 2009, 3 pages.
Canadian Office Action, Application No. 2,523,595, Applicant: Huawei Technologies Co., Ltd., Aug. 25, 2010, 5 pages.
Communication pursuant to Article 96(2) EPC, EP Patent Application No. 04738238.7-2412, Applicant: Huawei Technologies Co., Ltd., May 10, 2006, 6 pages.
Communication pursuant to Article 96(2) EPC, EP Patent Application No. 04738238.7-2412, Applicant: Huawei Technologies Co., Ltd., Dec. 1, 2006, 6 pages.
Communication of a Notice of Opposition, EP Patent Application No. 04738238.7-2412, Applicant: Huawei Technologies Co., Ltd., Oct. 10, 2008, 235 pages.
Response to Notice of Opposition, EP Patent Application No. 04738238.7-2412, Applicant: Huawei Technologies Co., Ltd., May 15, 2009, 11 pages.
Interrogation of JP Patent Application No. 2006-508100, Demandant: Huawei Technologies Co., Ltd., Jul. 13, 2010, 3 pages.
English Translation of Interrogation of JP Patent Application No. 2006-508100, Demandant: Huawei Technologies Co., Ltd., Jul. 13, 2010, pp. 1-4.
"Mobility Management," http://en.wikipedia.org, Apr. 27, 2009, pp. 1-4.
"$3^{rd}$ Generation Partnership Project; Technical Specification Group Services and System Aspects; General Packet Radio Service (GPRS); Service description; Stage 2 (Release 5)," 3GPP TS 23.060, V5.5.0, Mar. 2003, 11 pages.
"$3^{rd}$ Generation Partnership Project; Technical Specification Group Services and System Aspects; Functional stage 2 description of LCS (Release 4)," 3GPP TS 23.271, V4.8.0, Dec. 2002, 67 pages.

* cited by examiner

INTERACTIVE METHOD FOR REPORTING LOCATION REPORT BY TARGET USER EQUIPMENT IN LOCATION SERVICE

PRIORITY

This application claims priority to Patent Cooperation Treaty (PCT) Application No. PCT/CN2004/000640 filed on Jun. 14, 2004 entitled, INTERACTIVE METHOD FOR REPORTING LOCATION REPORT BY TARGET USER EQUIPMENT IN LOCATION SERVICE, which claims priority to Chinese Patent Application Serial No. 03148654.1, filed Jun. 12, 2003 all of the disclosures of which are incorporated herein by reference in their entirety.

FIELD OF THE TECHNOLOGY

The present invention relates to positioning technique, and more particularly to an interactive method for reporting location reports by target user equipment (UE) in Location Service (LCS).

BACKGROUND OF THE INVENTION

LCS of a mobile communication network is to obtain the location information of a target UE by means of positioning technique, where the target UE refers to a target UE to be positioned in a mobile communication network and the location information may be the geographical information expressed in the form of latitude and longitude data or the location information with reference to local streets. The location information obtained by LCS system may be provided to the target UE for self-positioning, or to the communications system itself for area-specific charging or operation and maintenance, or to other clients, for instance agencies or individuals, that request for the location information of the target UE for use of value-added services. Therefore, LCS has wide applications in many fields such as emergency aid, vehicle navigation and intelligent traffic system, scheduling and team management, mobile yellow page inquiry, and enhanced network performance etc. In the Third Generation Partner Project (3GPP), specifications on LCS as well as the functional mode, structure, state description, and message flow of the LCS system have been proposed.

FIG. 1 is a schematic diagram showing the logical structure implementing LCS. As shown in FIG. 1, Applicant 101 requests the location information of Target UE 103 through Network 102 containing LCS system. Network 102 containing LCS system makes a legitimate authentication of Applicant 101 to check whether Target UE 103 permits Applicant 101 to request for its location information. If Applicant 101 passes the legitimate authentication of Network 102 containing LCS system, Network 102 locates Target UE 103 and provides Applicant 101 with the location information of Target UE 103; otherwise, Network 102 containing LCS system refuses the request from Applicant 101 for the location information of Target UE 103. Applicant 101 may comprise applicants and LCS clients. Said LCS client refers to software or hardware entity for obtaining the location information of one or more target UEs 103, which is interfaced with Network 102 containing LCS system. Said applicant refers to an LCS application client for requesting the location information of a target UE, such as an agency or an individual, which is the initiator of a location request. While LCS client can also be an applicant at the same time.

Functional entities for implementing location service in LCS system include Gateway Mobile Location Center (GMLC), subscribers' data storage server (HLR/HSS), Core Network (CN), and Radio Access Network (RAN). Wherein, GMLC may further include Requesting-GMLC (R-GMLC), Home-GMLC (H-GMLC), and Visited-GMLC (V-GMLC). R-GMLC refers to the GMLC in the network containing LCS system, which receives the location request for the target UE from an applicant, H-GMLC refers to the GMLC in the network containing LCS system, to which the target UE belongs, and V-GMLC refers to the GMLC in the network containing LCS system, which is currently visited by the target UE, that is, the GMLC in the network where the target UE currently locates. Wherein, R-GMLC, H-GMLC, and V-GMLC may be one physical entity.

At present, in 3GPP specifications, the Deferred Location Request Procedure for the change of area event and the implementation are provided. Said location request message of area variation class refers to the message in condition that the applicant designates in advance the target area and events for triggering location reports, for instance, a location report is requested to be reported to the applicant when the target UE enters, leaves, or is located at the designated target area. Said LCS system sends to the target UE the information about the designated target area and events for triggering location reports, and the target UE saves the information and initiates at the same time the appropriate application program. When the application program detects the occurrence of an event for triggering a location report, for instance, when the target UE has entered, left, or located in the designated target area, the target UE will report to the LCS system a location report, and the LCS system will forward the location report to the appropriate applicant, informing the corresponding applicant that the event designated for triggering a location report has occurred. In addition, the applicant may also designate the number of location reports required to be reported by the target UE, for instance, only one location report should be reported, or designate a valid period of time in which the target UE should periodical report location reports. In summery, with area variation class location requests, an applicant is able to define conveniently some LCSs with track monitoring function, for instance, child tracking and pet tracking, which make LCS be widely used for track monitoring.

FIG. 2 shows the message interaction in the processing of area variation class location request in the prior art. As shown in FIG. 2, the message interaction in the processing of area variation class location request comprises the steps of:

Step 201: the applicant sending to R-GMLC an LCS Service Request, which carries the identity of a target UE, designated target area, and events for triggering location reports, wherein the events for triggering location reports may comprise: reporting a location report when the target UE enters, leaves, or locates in the designated target area. The LCS Service Request may carry the valid time period of the LCS Service Request as well, for instance, the starting time and ending time, and the number of location reports reported by the target UE requested by the LCS Service Request. If a plurality of location reports is required, the LCS Service Request will also need to carry the time interval among the periodical reported location reports. This LCS Service Request is then the area variation class location request as mentioned above.

Step 202: after receiving the LCS Service Request, R-GMLC forwarding this LCS Service Request to H-GMLC, which makes a legitimate authentication for the applicant to determine whether the target UE permits the LCS system to provide this applicant with the location information of the target UE. If the applicant passes the legitimate authentication, HGMLC sending to V-GMLC the LCS Service Request;

otherwise, H-GMLC returning to R-GMLC an authentication failed acknowledgment (Ack), R-GMLC refusing the area variation class location request for the target UE initiated by the applicant and ending the current processing of the area variation class location request.

Step 203: V-GMLC, after receiving the LCS Service Request, converting the designated target area carried by said request to a geographical identity identifiable to the network and sending to CN a Provide Subscriber Location request, which carries the identity of the target UE, the converted designated target area expressed in the network geographic format, and events for triggering location reports. Corresponding to the information carried in the LCS Service Request, this Provide Subscriber Location request may carry the number of the location reports reported as well, and if a plurality of location reports is required, the time interval among the periodically reported location reports is also carried.

Step 204: CN, when detecting the target UE is in the idle mode, initiating a paging for the target UE, and making authentication and ciphering for the target UE to judge whether the target UE is a legitimate network device. Furthermore, CN sending to the target UE a privacy verification notification, notifying the target UE that an applicant is requesting for its location information, and the target UE itself verifying whether to permit the LCS system to provide the applicant with the location information of the target UE.

Steps 205~206: CN sending to the target UE via RAN a Location Area Event Invoke request, and the information carried in the Location Area Event Invoke request is corresponding to the information carried in the LCS Service Request. After receiving the Location Area Event Invoke request, the target UE starting the relevant application program in itself, monitoring the occurrence of the events for triggering location reports, and sending to CN a Location Area Event Invoke Ack, notifying CN that the current location request has been accepted and properly handled.

Steps 207~210: after receiving the Location Area Event Invoke Ack, CN sending to V-GMLC a Provide Subscriber Location Ack, notifying V-GMLC that the current area variation class location request has been accepted. After receiving the Provide Subscriber Location Ack, V-GMLC sending to H-GMLC an LCS Service Response, notifying H-GMLC that the current area variation class location request has been accepted. After receiving the LCS Service Response, H-GMLC sending to R-GMLC the LCS Service Response, notifying R-GMLC that the current area variation class location request has been accepted. After receiving the LCS Service Response, R-GMLC sending to the applicant the LCS Service Response, notifying the applicant that the current area variation class location request has been accepted by the target UE.

Steps 211~212: an event triggering a location report occurs, that is, the target UE enters, leaves, or locates in the designated target area, and the target UE sending via RAN a Location Area Event Report to CN that covers the designated target area, notifying CN that an event triggering a location report has occurred.

Steps 213~214: after receiving the Location Area Event Report, CN sending a Subscriber Location Report to V-GMLC that covers the designated target area, notifying the V-GMLC that the event triggering a location report of the target UE has occurred. After receiving the Subscriber Location Report, V-GMLC sending to CN a Subscriber Location Report Ack, notifying CN that the Subscriber Location Report sent by CN has been received. At this moment, CN may generate a corresponding billing record for the current location request.

Steps 215~218: after sending the Subscriber Location Report Ack to CN that covers the designated target area, V-GMLC sending to H-GMLC an LCS Service Response, notifying H-GMLC that an event triggering a location report of the target UE has occurred. After receiving the LCS Service Response, H-GMLC making authentication (privacy check) for the applicant to ensure that the location information of the target UE provided to the applicant is permitted under the authorization for this applicant. After the applicant passes the authentication, H-GMLC sending to R-GMLC an LCS Service Response, notifying R-GMLC that the event triggering a location report of the target UE has occurred. After receiving the LCS Service Response, R-GMLC sending to the applicant an LCS Service Response, notifying the applicant that the event triggering a location report of the target UE has occurred. Said V-GMLC in steps 211~218 refers to GMLC where the target UE currently locates and which is able to cover the target area, it can be the same GMLC as V-GMLC said in steps 202~210, or a different GMLC from V-GMLC said in steps 202~210. Likewise, CN said in steps 211~218 refers to CN where the target UE currently locates and which is able to cover the target area, it can be the same CN as said in steps 202~210, or a different CN from that in steps 202~210.

If an area variation class location request carries the interval among the periodically reported location reports and the number of the location reports, then the interval among the location reports reported by the target UE to the CN that covers the designated target area can not be smaller than the interval among the area variation class location requests, and the total number of location reports can not exceed the number required in the area variation class location request. The processing procedure of reporting each location report is basically the same as the above process shown in steps 211~218.

As can be seen from the above message interactive process of area variation class location request defined by the 3GPP specifications, in step 212, when the target UE detects that an event triggering a location report has occurred, it will send via RAN a Location Area Event Report to CN that covers the designated target area, notifying CN that an event triggering a location report has occurred; in step 213, however, when receiving the Location Area Event Report, CN will not return to the target UE a corresponding response to notify the target UE that the Location Area Event Report sent by the target UE has been successfully received, but send to V-GMLC a Subscriber Location Report to notify V-GMLC that the event triggering a location report of the target UE has occurred. In the subsequent process CN will not return to the target UE a corresponding response either, which results in that the target UE can not determine whether CN that covers the designated target area has received the Location Area Event Report, increasing the uncertainty in the implementation of the LCS.

Moreover, as there is difference in the supporting capability of CNs in the network for LCS, for example some CNs are capable of supporting the area variation class location request, while others are not. CNs not supporting the processing of area variation class location requests may directly discard such location reports as it cannot identify the report when receiving a location report sent by the target UE. Thus, since in the present processing procedure there is no step of CN returning to the target UE a corresponding response, the target UE is unable to learn whether the reported location report has been properly processed by CN or discarded by CN.

In addition, there are other reasons that leads to the loss of the location reports reported to CN by the target UE, for instance, when the message is transferred via a wireless channel, the message may be lost due to instable radio signaling. As there is no mechanism by which CN returns a corresponding response to the target UE, the target UE will not know whether CN has properly received the location report currently reported. Furthermore, in the prior art the target UE makes no more reporting of the location report after one time of reporting to CN. If the location report reported is lost, even that an event triggering a location report that is designated by the applicant has occurred, the LCS system will not return any location reports of the target UE to the corresponding applicant, since CN has not received a location report of the target UE, which leads to a failure in the middle of the current processing procedure. Thus, the applicant can not properly receive the location report reported by the target UE, which adds uncertainty in the implementation of LCS.

Apart from the above description, there are some services as Advice of Charge Charging (AoCC) for charging, making use of the target UE, as well as Advice of Charge Information (AoCI) for providing the charging information, making use of the target UE. In accordance with the processing procedure of the prior art, as there is no mechanism for CN returning a corresponding response to the target UE, the current service will be charged right after the target UE has reported the location report, but if the LCS system does not receive this location report at this time due to some abnormal reasons, a charging error for the target UE may occur.

SUMMARY OF THE INVENTION

In view of the above, the present invention is to provide an interactive method for reporting location reports by the target UE in the LCS, so as to reduce errors in the reporting process of location reports and lower the uncertainty in the implementation of LCS.

The interactive method for reporting location reports by the target UE in LCS according to the present invention comprises the steps of:

A. the target UE receiving a location request initiated by an applicant, and reporting a location report to the LCS system after detecting the occurrence of an event triggering a location report;

B. after receiving the location report reported by the target UE, the LCS system returning to the target UE a location report acknowledgement.

In accordance with the method presented by the present invention, a mechanism for the LCS system to return a location report acknowledgement to the target UE is added, such that the target UE will not end its processing procedure after reporting a location report to the LCS system, but determine the subsequent operation according to whether it has received the location report acknowledgement returned by the LCS system, thereby avoiding the failure in the middle of the operation caused by the LCS system not receiving the location report reported by the target UE, reducing the errors in the location reports, and lowering the uncertainty in the implementation of LCS.

In addition, this processing mechanism is able to avoid errors in charging the target UE in the AoCC service using the target UE for charging and in the AoCI service using the target UE for providing the charging information.

DETAILED DESCRIPTION OF THE INVENTION

The preferred embodiments are described in detailed hereinafter with reference to the accompanying drawings.

In accordance with the preferred embodiments of the present invention, a mechanism for CN returning a location report acknowledgement to the target UE is added such that the target UE will not end its processing procedure after reported a location report to CN, but determine the subsequent operations according to whether it has received a location report acknowledgement returned by CN.

For a better implementation of this invention, while reporting a location report to CN, the target UE starts a timer designating a time period and waits for CN to return a location report acknowledgement within the designated time period. If CN returns a location report acknowledgement to the target UE within the designated time period, the target UE will stop the timer designating the time period; if CN does not return a location report acknowledgement to the target UE within the designated time period, the target UE will report the location report once again to CN when the timer designating the time period is time-out, and at the same time, restart the timer designating the time period and keep on waiting in the designated period of time for CN to return a location report acknowledgement. In order to prevent the target UE from keeping on reporting location reports for a long time, a valid time period or the number of the re-reporting times of location report may be set in advance. If the target UE has not received a location report acknowledgement within the valid time period, that is, within the set number of designated time periods, or has not received an acknowledgement when the number of the re-reporting times of location report to CN exceeds the set number, the target UE will no longer report the location report to CN.

Figure 1:
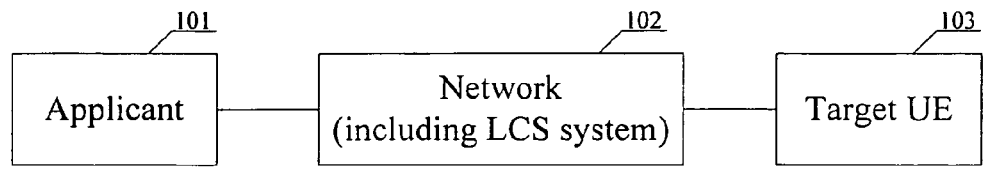
FIG. 1 is a schematic diagram showing the logical structure of LCS implementation.
Figure 2:
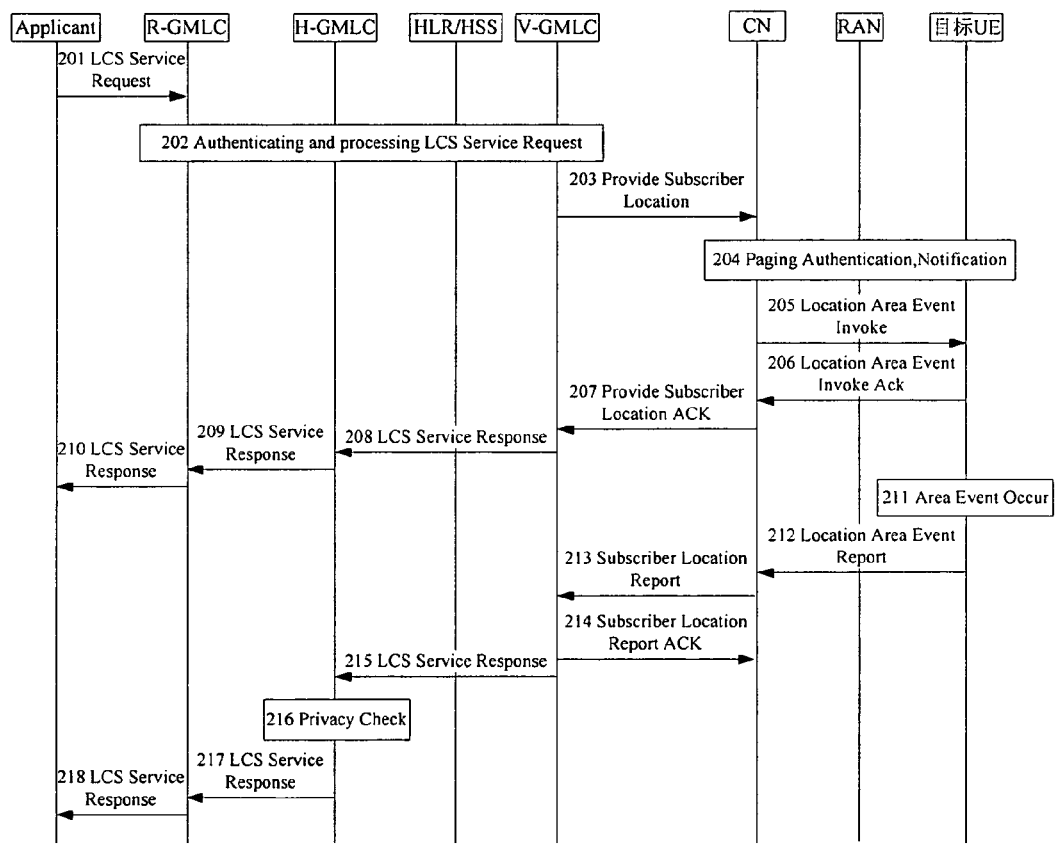
FIG. 2 shows the message interaction in the processing of an area variation class location request in the prior art.
Figure 3:
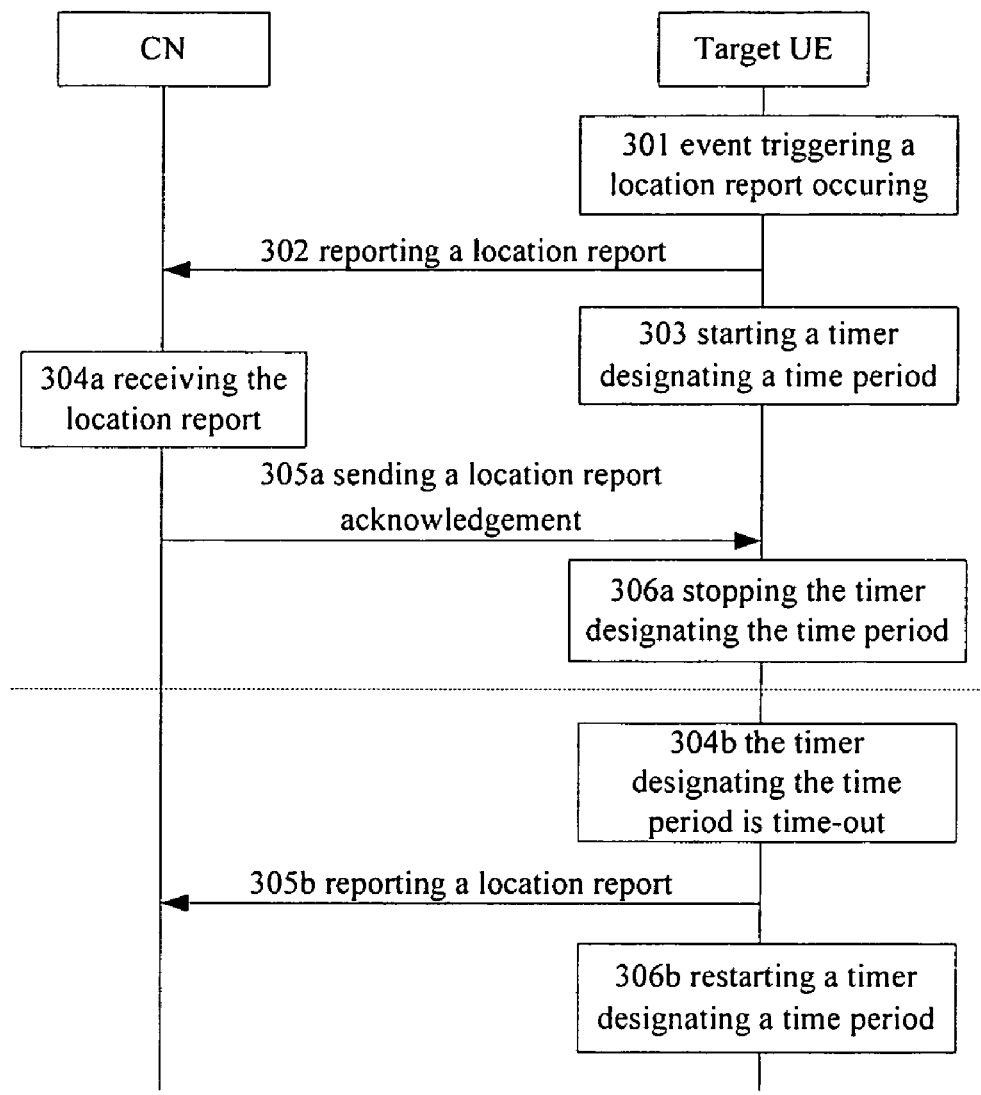
FIG. 3 is the interactive flowchart of a target UE reporting a location report to CN in accordance with the preferred embodiment of the present invention.

FIG. 3 is the interactive flowchart of a target UE reporting a location report to CN in accordance with the present invention. As shown in FIG. 3, the interactive process for a target UE to report a location report to CN comprising the steps of:

Steps 301~303: after detecting the occurrence of an event triggering a location report, the target UE reporting the location report to CN, starting the timer designating a time period at the same time, and waiting in the designated time period for CN to return a location report acknowledgement.

For the following steps, there is the possibility that the target UE receives a location report acknowledgement returned by CN as well as the possibility that the target UE does not receive a location report acknowledgement returned by CN. Therefore, the target UE will perform different subsequent operations depending on whether it has received a location report acknowledgement returned by CN:

When the timer designating the time period is not time-out, the subsequent operations after the target UE has received a location report acknowledgement returned by CN comprises the steps of:

Steps 304a~306a: after receiving the location report reported by the target UE, CN returning to the target UE a location report acknowledgement. After receiving the location report acknowledgement, the target UE stopping the timer designating the time period. The location report acknowledgement returned to the target UE by CN may carry various parameters, such as information of the processing result of the location report by CN, and etc.

When the timer designating the time period is time-out but the target UE does not receive a location report acknowledgement returned by CN, the subsequent operations comprising the steps of:

Steps 304b~306b: when the timer designating a time period is time-out, the target UE reporting to CN the location report once again, re-starting the timer designating the time period at the same time, and waiting in the designated time period for CN to return a location report acknowledgement.

In the subsequent process, if the target UE receives a location report acknowledgement returned by CN, then repeat the steps 304a~306a; if the target UE does not receive a location report returned by CN, then repeat the steps 304b~306b. If the target UE has not received a location report acknowledgement within the valid time period, that is, within the set number of designated time periods, or has not received an acknowledgement when the number of re-reporting times of the location report to CN exceeds the set number, the target UE will no longer report the location report to the CN in the interactive process with the current CN, but set an appropriate flag indicating an unsuccessful sending of this location report. In the subsequent processing, when the target UE updates its location and enters an area covered by another CN, the target UE will send a location report once again to the current CN in accordance with the saved flag of the unsuccessful sending. When the target UE receives a location report acknowledgement returned by CN, indicating CN has successfully processed the location report, the target UE clears the saved flag of the unsuccessful sending of the location report.

If the target UE is required to make a plurality of location reports or to make periodical reporting of location reports to CN, the above steps should be followed every time that the target UE reports a location report to CN. As the time interval among each location reports to CN by the target UE is in a different order of magnitude from that of the designated time period and the valid time period set in the interactive process of reporting a location report to CN by the target UE, it is not possible that the target UE is unable to determine whether a new location report or the old one is to be reported.

For instance, in a location service, an applicant initiates to a network with an LCS system an area variation class location request for a target UE, requesting that the network with an LCS system for sending an event report notification to the applicant immediately after the target UE enters a designated target area. The network with an LCS system sends to the target UE the area variation class location request that carries the designated target area and events for triggering location reports. After receiving the area variation class location request, the target UE monitors the occurrence of the events for triggering location reports.

When the target UE detects the occurrence of an event triggering a location report, for example, the target UE entering the designated the target area, the target UE will send to CN a Location Area Event Report, notifying CN that the event triggering a location report has occurred, and at the same time, start the timer designating a time period, waiting in the designated time period for CN to return a Location Area Event Report Ack.

If CN has received the Location Area Event Report and has returned to the target UE a Location Area Event Report Ack within the designated time period, the target UE will stop the timer designating the time period after receiving the Location Area Event Report Ack. This Location Area Event Report Ack may carry various parameters, for instance, the information of the processing result of the location report by CN.

If CN has not returned a Location Area Event Report Ack to the target UE within the designated time period, the target UE will once again send to CN the Location Area Event Report when the timer designating the time period is time-out, restart the timer designating the time period at the same time, and continue to wait in the designated time period for CN to return thereto a Location Area Event Report Ack.

If the area variation class location request initiated by the applicant carries the time interval among the periodically reported location reports and the number of reportings thereof, the target UE should follow the above process every time it reports a location report to CN.

In the AoCC service using target UE for charging and the AoCI service using target UE for providing the charging information, the target UE can generate the charging information of the current service after having received the Location Area Event Report Ack returned by CN, thereby ensuring the correctness in charging the target UE.

In the above process, the target UE may send a location report directly to H-GMLC; in this case it is H-GMLC that will return a location report acknowledgement to the target UE.

It is appreciated that the above description is the preferred embodiments of the present invention, and should not be construed as limits to the protection scope of the present invention.

The invention claimed is:

1. An interactive method for reporting location reports by a target user equipment (UE) in a location service (LCS) system, the method comprising:
   the target UE receiving a location request initiated by an applicant;
   the target UE reporting a location report to a Core Network (CN) in the LCS system after having detected an occurrence of an event triggering the location report in a Deferred Location Request Procedure; and
   the target UE receiving a location report acknowledgement in the Deferred Location Request Procedure from the CN after the CN receives the location report from the target UE, wherein the location report acknowledgement carries parameters comprising information of a processing result of the location report.

2. The interactive method for reporting location reports by a target UE in an LCS according to claim 1, wherein the target UE reporting the location report to the CN further comprises: the target UE starting a timer designating a time period for receiving the location report acknowledgement from the CN upon reporting the location report to the LCS system.

3. The interactive method for reporting location reports by a target UE in an LCS according to claim 2, further comprising: the target UE receiving the acknowledgement within the time period designated and stopping the timer.

4. An interactive method for reporting location reports by a target user equipment (UE) in a location service (LCS) system, the method comprising:
   the target UE receiving a location request initiated by an applicant;
   the target UE reporting a location report to a Core Network (CN) in the LCS system after having detected an occurrence of an event triggering the location report in a Deferred Location Request Procedure; and the target UE reporting the location report to the CN again when failing to receive a location report acknowledgement comprising parameters indicating information of a processing result of the location report in the Deferred Location Request Procedure from the CN.

5. The interactive method according to claim 4, wherein the target UE reporting the location report to the CN further comprises: the target UE starting a timer designating a time period for receiving the location report acknowledgement from the CN upon reporting the location report to the CN.

6. The interactive method according to claim 4, further comprising:

the target UE setting a flag indicating that sending of the location report is unsuccessful when failing to receive the location report acknowledgement.

7. The interactive method according to claim 6, the method further comprising:

when entering an area covered by another CN, the target UE sending the another location report to the another CN; and the target UE clearing the flag when receiving an another location report acknowledgement according to the another location report returned by the another CN.

8. An interactive method for receiving location reports by a target user equipment (UE) in a location service (LCS) system, the method comprising:

a Core Network in the LCS system sending a location request initiated by an applicant to the target UE;

the CN receiving a location report from the target UE after the target UE having detected an occurrence of an event triggering the location report in a Deferred Location Request Procedure; and the CN sending a location report acknowledgement to the target UE in the Deferred Location Request Procedure after receiving the location report from the target UE, wherein the location report acknowledgement comprises parameters indicating information of a processing result of the location report.

* * * * *